No. 761,333. PATENTED MAY 31, 1904.
T. L. & T. J. STURTEVANT.
GRINDING MILL.
APPLICATION FILED JAN. 23, 1902.
NO MODEL. 4 SHEETS—SHEET 4.
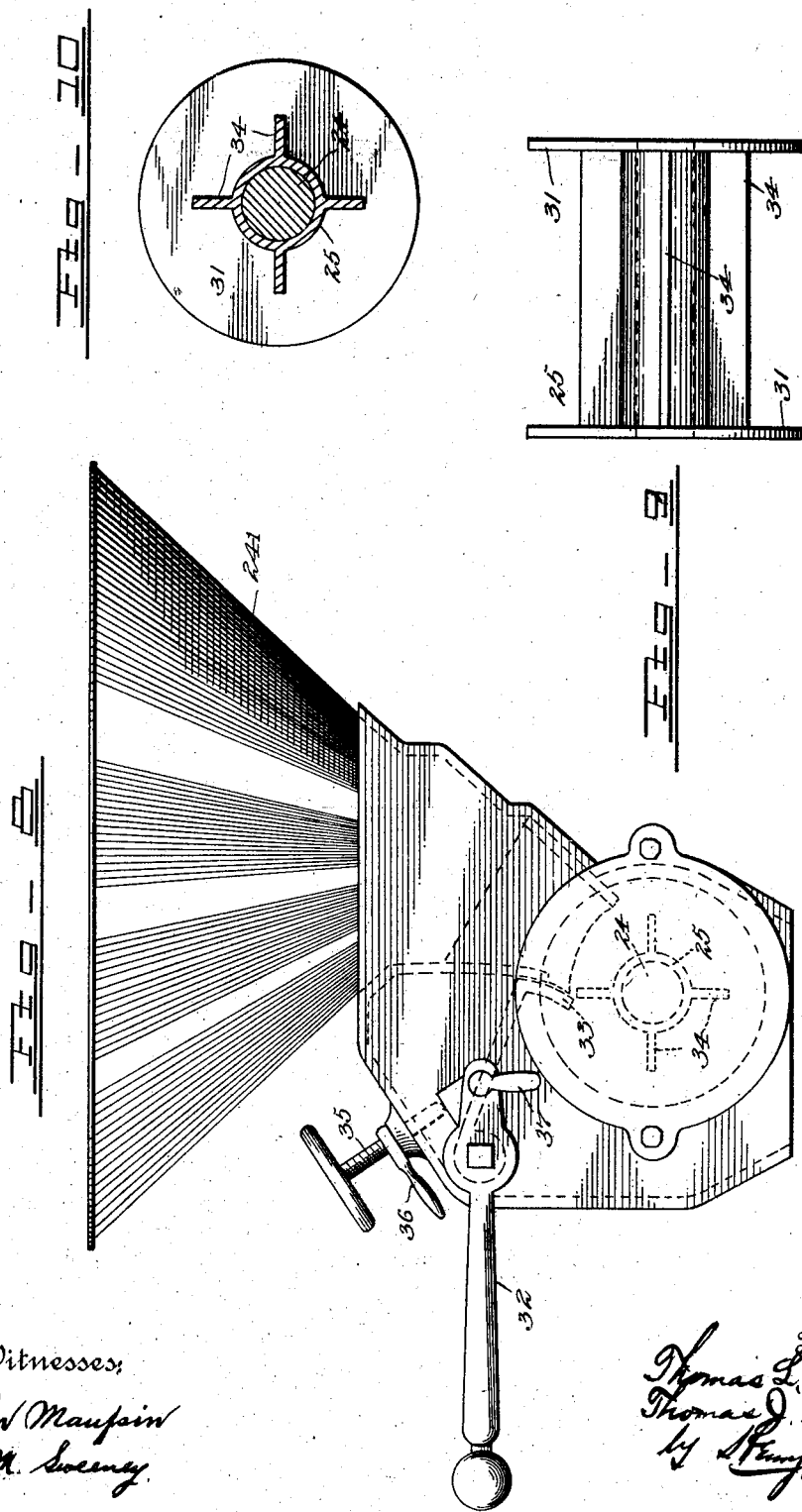

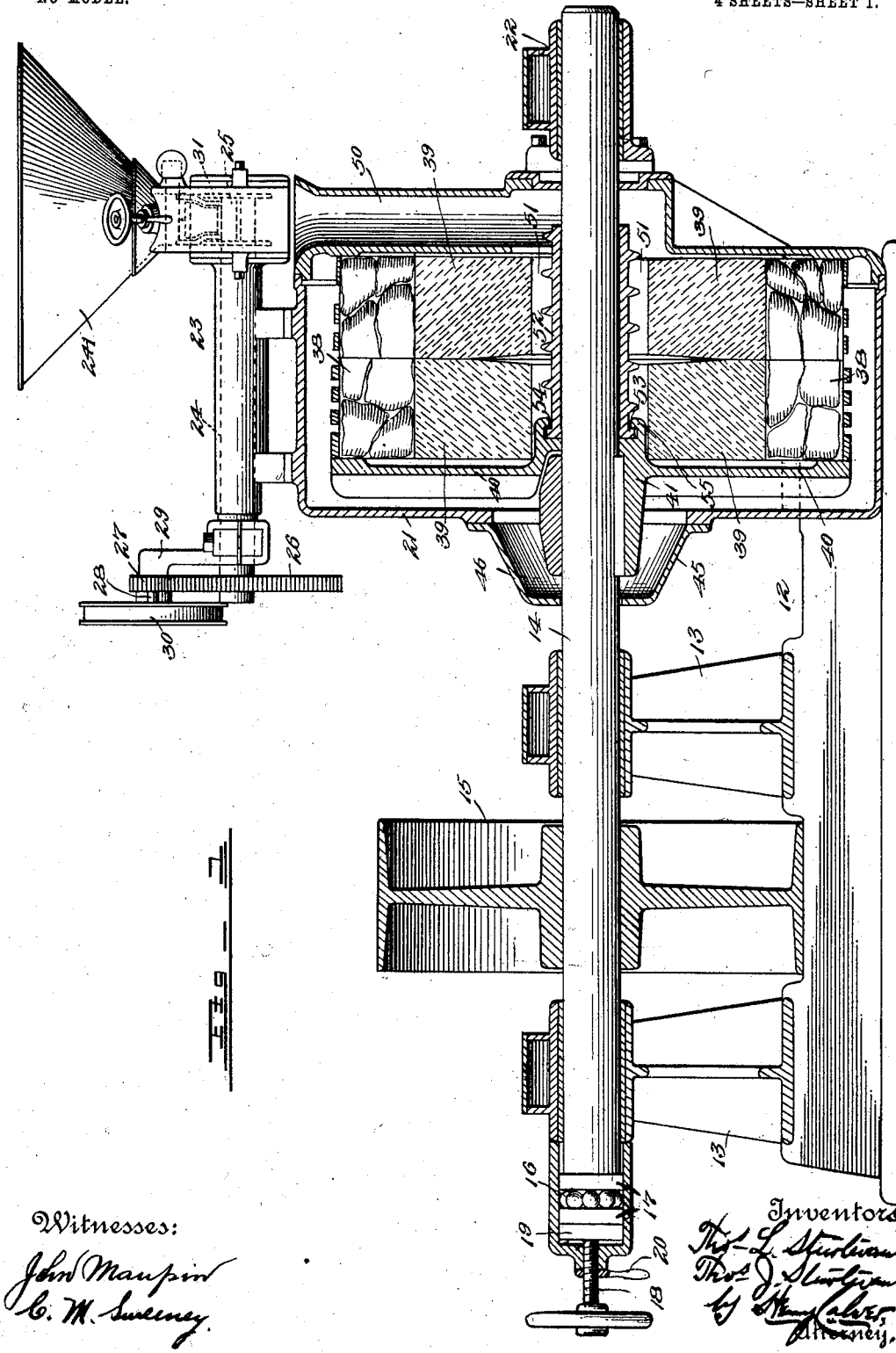

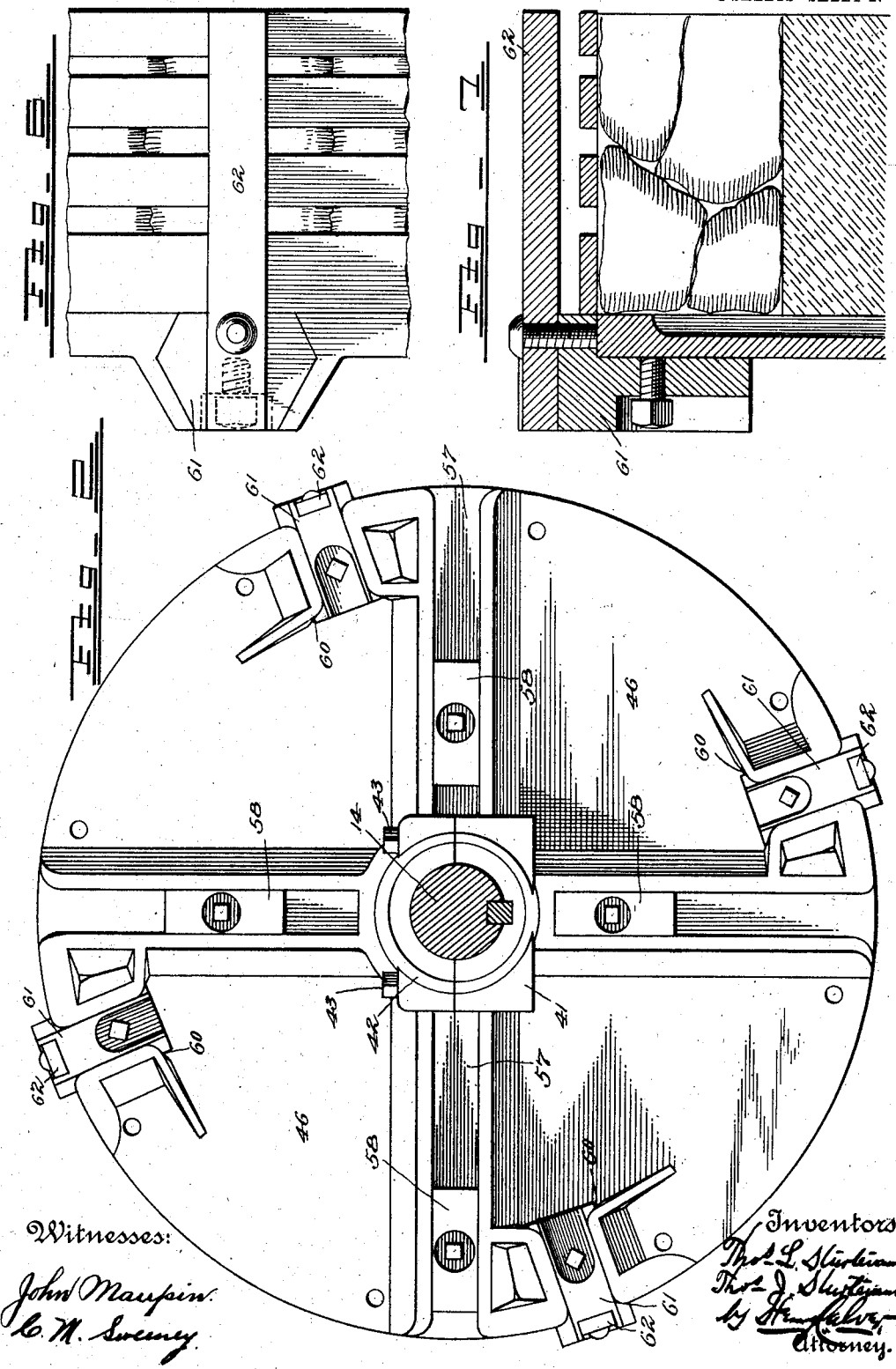

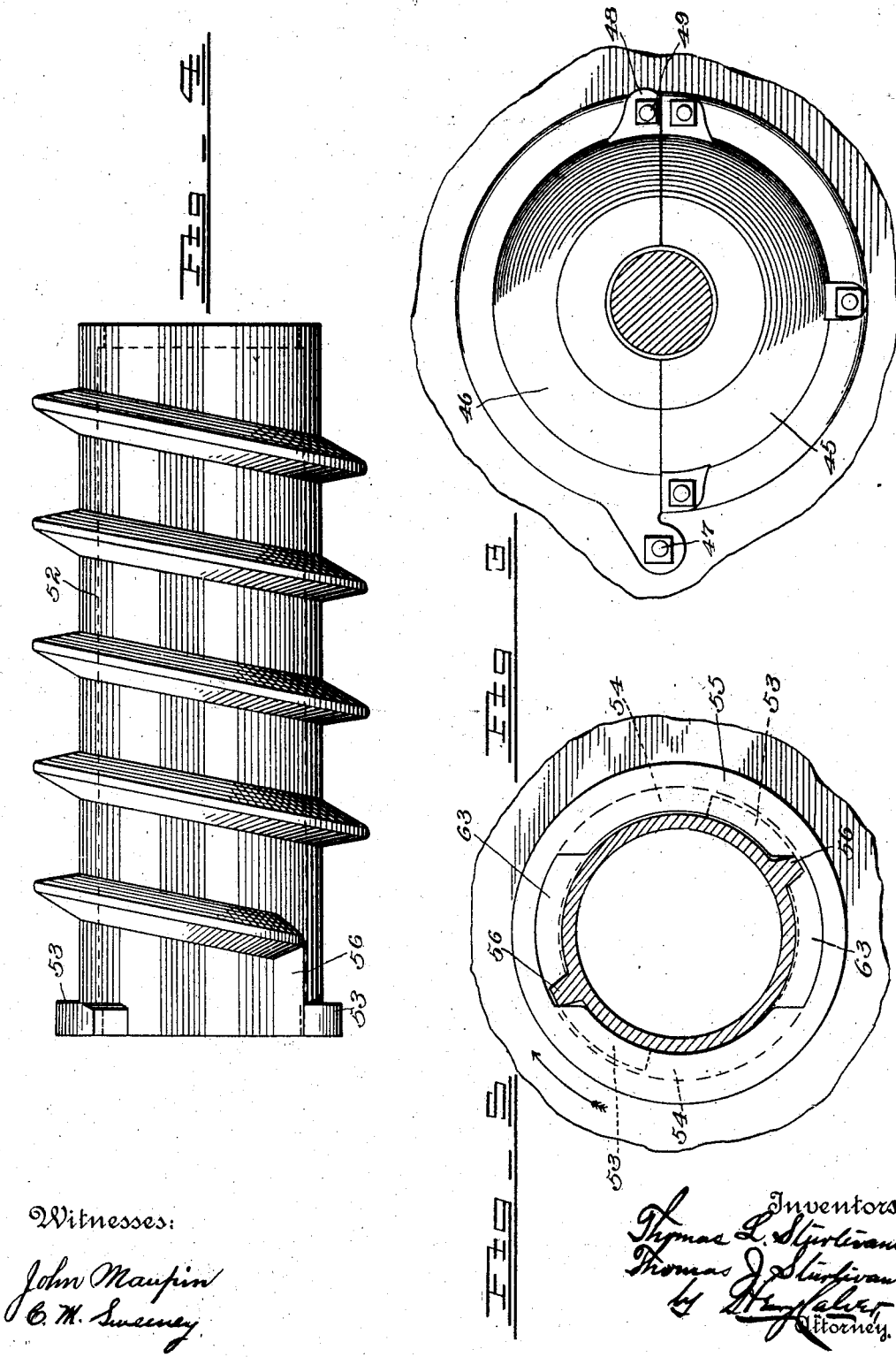

No. 761,333.

Patented May 31, 1904.

UNITED STATES PATENT OFFICE.

THOMAS L. STURTEVANT, OF QUINCY, AND THOMAS J. STURTEVANT, OF NEWTON CENTER, MASSACHUSETTS, ASSIGNORS TO STURTEVANT MILL COMPANY, OF PORTLAND, MAINE, A CORPORATION.

GRINDING-MILL.

SPECIFICATION forming part of Letters Patent No. 761,333, dated May 31, 1904.

Application filed January 23, 1902. Serial No. 90,919. (No model.)

*To all whom it may concern:*

Be it known that we, THOMAS L. STURTEVANT, residing at Quincy, in the county of Norfolk, and THOMAS J. STURTEVANT, residing at Newton Center, in the county of Middlesex, State of Massachusetts, citizens of the United States, have invented certain new and useful Improvements in Grinding-Mills, of which the following is a specification, reference being had therein to the accompanying drawings.

This invention relates to that class of grinding-mills for reducing rocks, ores, and other substances and comprising millstones which are arranged vertically and which class of mills has therefore come to be known as "vertical mills."

Our invention has for its object to improve the class of mills referred to in such a manner as to render them more efficient as well as more convenient in use.

In the accompanying drawings, Figure 1 is a vertical section of a mill embodying our invention. Fig. 2 is a detail view to show the runner-head provided with a clamping-hub. Fig. 3 is a detail view to show the divided cover for the clamping-hub. Fig. 4 is a detail view of the feed-screw, and Fig. 5 is a detail view to illustrate the constructions whereby the feed-screw is operatively connected with the runner-head. Figs. 6 and 7 are detail views to show the scrapers and their means of attachment to the runner-head. Figs. 8, 9, and 10 are detail views illustrative of the hopper and the hopper-feeding mechansm.

Referring to the drawings, 12 denotes a suitable frame provided with standards 13, in which is journaled the mill-shaft 14, provided with a driving-pulley 15, which latter in practice will preferably have a clutch connection with said shaft, but which clutch connection is for simplicity of illustration omitted from the present drawings, as it forms no part of the present invention. The mill-shaft will preferably have an adjustable thrust ball-bearing comprising balls 16, interposed between collars 17, and an adjusting-screw 18, impinging against a collar 19 and secured in any desired position of adjustment by the handled nut 20.

Suitably mounted on the frame 12 is a casing 21, to which is bolted a bearing 22 for one end of the mill-shaft and on which casing is mounted a frame 23, in which is journaled a feed-shaft 24, provided with a winged feed-wheel 25 and with a driving gear-wheel 26, meshing with a pinion 27 on a short shaft 28, journaled in a bracket 29 and provided with a driving-pulley 30. The frame 23 supports a hopper 241, the lower contracted portion or discharge-spout of which extends between end flanges 31, with which the feed-wheel 25 is provided, so that the said end flanges prevent dirt or grit from getting into the bearings of the feed-shaft. Mounted on the hopper-frame is a weighted feed-regulating lever 32, the inner end of which is provided with a gate 33, adjustable with said lever and the position of adjustment of which will regulate the outlet from the hopper relative to the wings 34 of the feed-wheel. The feed-regulating lever may be adjusted by means of the regulating-screw 35, which latter may be held in any desired position of adjustment by a lock-nut 36, and the said feed-regulating lever may be positively held in place by means of a handled set-screw 37, impinging against the hopper-frame.

The bed-stone 38 is suitably attached to the frame or casing 21, and the runner-stone 39 is connected with the mill-shaft 14 by means of a runner-head 40, to which said runner-stone is secured in any suitable or well-known manner. The runner-head 40 is provided with a hub comprising a portion 41 integral with said runner-head and a hub-cap 42, secured to the hub portion 41 by bolts 43, the hub portion 41 being connected with the shaft by means of a spline 44. To admit of convenient access to the hub of the runner-head and to the bolts by which the cap portion of the hub is secured to the runner-head portion thereof, a two-part cover comprising the portions 45 and 46 is provided. The part 46 is preferably hinged to the casing 21 by means of a bolt 47 and has a hooked portion 48, which engages one of the attaching-bolts 49. When the bolts 47 and 49 are suitably loosened, the hinged cover portion 46 may be raised to afford access to the hub of the runner-head or the interior of the mill-casing.

Located below the feed-wheel 25 is a feed-spout or passage-way 50, which communicates with a feed-chamber 51 afforded by openings formed in the centers of the bed and runner stones, and within said feed-chamber is arranged a feed-screw 52, provided at one end with peripheral lugs 53, adapted to fit in an annular recess 54, formed in the hub portion of the runner-head, and outside of which recess is an overhanging flange 55, partly cut away to afford openings 63 to permit the peripheral lugs of the feed-screw to be entered into the said annular recess 54, and then when one part, either the runner-head or the feed-screw, is partially rotated with reference to the other to bring the feed-screw lugs 53 beneath the hub-flange 55 the longitudinal stops 56, with which the screw is provided, will come in contact with the sides of the openings 63 in the overhanging flange 55, and thus the said feed-screw will be operatively locked to the said runner-head, so as to rotate therewith, and cannot be disconnected or withdrawn therefrom without first reversing the motion by which it was locked. The rotation of the runner-head in the direction denoted by the arrow in Fig. 5 will cause the parts to remain locked together, and a partial reverse rotation of the runner-head or a partial rotation of the feed-screw in the direction indicated by the said arrow when the runner-head is stationary will enable the parts to be disconnected.

The runner-head 40 is provided with dovetailed grooves 57, in which balance-weights 58 are preferably removably and adjustably secured by set-screws 59, and said runner-head is also provided with dovetailed recesses or pockets 60, in which are attached suitable blocks 61, to which are secured scrapers 62, overhanging the periphery of the runner-stone. These scrapers carry the reduced material in the chamber of the mill around to the discharge-opening (not shown) in the mill-casing.

The construction herein shown and described whereby the feed-screw is operatively connected with the feed-shaft by being locked to the hub portion of the runner-head which is splined to said shaft, is an important improvement over the constructions heretofore employed in this class of mills and in which the feed-screws were attached to the feed-shafts by means of set-screws and which attachment was not always reliable, as the feed-screws were liable at times to slip on the shafts and the latter were often badly scarred by reason of this slipping action. The divided clamping-hub of the runner-head is also an important feature of the invention, as it provides a convenient and satisfactory as well as a reliable fastening. The hinged or separable cover for the hub of the runner-head is also a convenient construction, as it admits of access to the clamping-hub of the runner-head from the outside of the casing and after the millstones have been placed in operative position. The construction whereby the scrapers are secured to blocks attached to the runner-head is also found to be convenient and economical, as this construction permits the scrapers to be readily replaced when necessary. Also the construction of the winged feed-wheel, provided with guard-flanges between which the spout of the hopper extends, is deemed an important improvement in that it provides in connection with the adjustable gate a reliable and easily-regulated feeding device, while the guard-flanges prevent grit and dirt from the incoming material from getting into the bearings of the feed-shaft.

The invention is not to be understood as being limited to all of the details of construction herein shown and described. For example, the feed-screw might be operatively connected with the recessed hub of the runner-head by a single peripheral lug and stop extending through a single opening in the overhanging flange of the said hub, and other variations within the limits of mechanical skill might be made in the details of the invention.

Having thus described our invention, we claim and desire to secure by Letters Patent—

1. In a grinding-mill, the combination with the mill-shaft and bed and runner stones, of a runner-head to which the runner-stone is attached and which is provided with a hub having an undercut recess, and a feed-screw mounted on said shaft and provided at one end with one or more peripheral lugs by which it is operatively connected with the undercut recess of said hub so as to rotate with said runner-head and be held against longitudinal movement.

2. In a grinding-mill, the combination with the mill-shaft and bed and runner stones, of a runner-head to which the runner-stone is attached and which is provided with a hub having an annular recess and a flange overhanging said recess but partly cut away to form one or more openings, and a feed-screw mounted on said shaft and provided at one end with one or more peripheral lugs and one or more longitudinal stops, said lug or lugs being of proper size to enter the said opening or openings in the overhanging flange of the hub and said stop or stops serving as a point or points of engagement with the end wall or walls of said opening or openings to cause the said feed-screw to rotate with the said hub when the parts described are properly assembled.

3. Means for securing the feed-screw of grinding-mills to a rotating runner-head comprising a hub on the runner-head having an undercut recess the overhanging flange of which is partly cut away, radial stops within said recess, and radially-projecting lugs on the feed-screw which enter said recess and take their bearing against said stops.

4. In a grinding-mill, the combination with a runner-head provided with radially-arranged recesses or pockets near its periphery, of scraper-supporting blocks adjustably mounted in said recesses or pockets, and scrapers removably attached to said blocks and overhanging the periphery of the runner-stone.

5. In a grinding-mill, the combination with a runner-head provided with radially-arranged undercut recesses or pockets near its periphery, of scraper-supporting blocks adjustably mounted in said recesses or pockets, and scrapers removably attached to said blocks and overhanging the periphery of the runner-stone.

6. In a grinding-mill, the combination with the grinding or reducing devices, of a hopper provided with a depending spout, a rotating winged feed-wheel located below said hopper and serving to cause the material in the hopper to be properly fed to the grinding or reducing devices, said feed-wheel having end flanges between which said spout extends, an adjustable gate adjacent to said spout and coöperating with the wings of said feed-wheel, to regulate the feed of the material, an adjustable weighted lever by which said gate is carried, and a stop to prevent said gate from opening by the weight of said lever.

7. In a grinding-mill, the combination with the grinding or reducing devices, of a hopper provided with a depending spout, a rotating winged feed-wheel located below said hopper and serving to cause the material in the hopper to be properly fed to the grinding or reducing devices, said feed-wheel having end flanges between which said spout extends, and an adjustable gate coöperating with the wings of said feed-wheel to regulate the feed of the material, an adjustable weighted lever by which said gate is carried, and a regulating-screw for varying the position of said lever.

8. In a grinding-mill, the combination with the mill-shaft and bed and runner stones, of a runner-head to which the runner-stone is attached, a divided hub one portion of which is integral with said runner-head and which integral portion is splined to said shaft and provided with an undercut recess, the other portion of said hub consisting of a clamping-cap bolted to the integral portion of said hub, and a feed-screw mounted on said shaft and provided at one end with one or more peripheral lugs by which it is operatively connected with the undercut recess of said hub so as to rotate with said runner-head and be held against longitudinal movement.

In testimony whereof we affix our signatures in presence of two witnesses.

THOMAS L. STURTEVANT.
THOMAS J. STURTEVANT.

Witnesses:
LLOYD MAKEPEACE,
O. B. MONEY.